United States Patent
Gul et al.

(10) Patent No.: US 10,708,086 B2
(45) Date of Patent: Jul. 7, 2020

(54) CHANNEL SOUNDING TECHNIQUES

(71) Applicant: NATIONAL INSTRUMENTS CORPORATION, Austin, TX (US)

(72) Inventors: Malik Muhammad Usman Gul, Rawalpindi (PK); Ahsan Aziz, Austin, TX (US); James Wesley McCoy, Austin, TX (US)

(73) Assignee: National Instruments Corporation, Austin, TX (US)

( * ) Notice: Subject to any disclaimer, the term of this patent is extended or adjusted under 35 U.S.C. 154(b) by 243 days.

(21) Appl. No.: 15/409,261

(22) Filed: Jan. 18, 2017

(65) Prior Publication Data
US 2017/0207931 A1    Jul. 20, 2017

Related U.S. Application Data
(60) Provisional application No. 62/280,173, filed on Jan. 19, 2016.

(51) Int. Cl.
| | |
|---|---|
| *H04L 25/02* | (2006.01) |
| *H04W 56/00* | (2009.01) |
| *H04J 13/00* | (2011.01) |
| *H04L 25/03* | (2006.01) |

(52) U.S. Cl.
CPC ...... *H04L 25/0224* (2013.01); *H04J 13/0059* (2013.01); *H04L 25/022* (2013.01); *H04W 56/001* (2013.01); *H04L 25/03159* (2013.01)

(58) Field of Classification Search
CPC ............... H04L 25/0224; H04L 25/022; H04L 25/03159; H04J 13/0059; H04W 56/001
See application file for complete search history.

(56) References Cited

U.S. PATENT DOCUMENTS

| | | | | |
|---|---|---|---|---|
| 6,243,372 | B1 * | 6/2001 | Petch ................... | H04J 3/0682 370/324 |
| 7,366,207 | B1 * | 4/2008 | Vaishnav .............. | H04J 3/062 370/509 |
| 7,778,151 | B2 | 8/2010 | Bertrand | |
| 8,064,552 | B2 * | 11/2011 | Chester ................. | G06F 17/15 375/130 |
| 8,098,745 | B2 * | 1/2012 | Bertrand ............... | H04J 13/00 375/130 |
| 2003/0189894 | A1 * | 10/2003 | Nee ...................... | H04L 1/0002 370/208 |

(Continued)

*Primary Examiner* — Michael Thier
*Assistant Examiner* — Brian P Cox
(74) *Attorney, Agent, or Firm* — Kowert, Hood, Munyon, Rankin & Goetzel, P.C.; Jeffrey C. Hood; Michael B. Davis

(57) ABSTRACT

Techniques are disclosed relating to channel sounding. In some embodiments a transmitter transmits a periodic CAZAC sequence beginning at a point in time that corresponds to a timing signal (e.g., a pulse-per-second signal). In some embodiments, a receiver waits to begin processing received sequences for a time interval corresponding to the length of the CAZAC sequence, where the time interval begins at the same time as the timing signal. This may avoid a need for timing synchronization prior to processing, reduce processing and latency in receiver implementations, and may allow determination of a TOA as well as a channel impulse response estimate by correlating a received cyclically-shifted CAZAC sequence with a local version of the transmitted CAZAC sequence.

17 Claims, 7 Drawing Sheets

(56) References Cited

U.S. PATENT DOCUMENTS

| | | | |
|---|---|---|---|
| 2007/0069952 A1* | 3/2007 | Ling | G01S 5/0226 342/463 |
| 2010/0026576 A1* | 2/2010 | Belcea | G01S 5/0215 342/387 |
| 2010/0067591 A1* | 3/2010 | Luo | H04L 1/0025 375/260 |
| 2010/0220614 A1 | 9/2010 | Seong | |
| 2010/0279707 A1* | 11/2010 | Fischer | G01S 5/021 455/456.1 |
| 2012/0014349 A1 | 1/2012 | Chung | |
| 2012/0106380 A1* | 5/2012 | Vaidyanathan | G01S 1/024 370/252 |
| 2016/0154089 A1* | 6/2016 | Altman | G01S 7/52004 367/124 |
| 2016/0262123 A1* | 9/2016 | Abedini | H04W 56/0015 |
| 2016/0374034 A1* | 12/2016 | Abedini | H04W 56/001 |

* cited by examiner

CHANNEL SOUNDING TECHNIQUES

This application claims the benefit of U.S. Provisional Application No. 62/280,173, filed on Jan. 19, 2016, which is incorporated by reference herein in its entirety.

TECHNICAL FIELD

The present disclosure is related to wireless communications and more particularly to channel sounding techniques.

DESCRIPTION OF THE RELATED ART

Wireless radio communications can be significantly affected by the communications environment. For example, urban environments typically have obstacles that create more multipath, relative to typical rural environments. Channel sounding is a technique that is used to develop models of wireless communications environments, and these models may be then be used to classify and improve communications. Typically a test transmitter transmits a broadband test signal which is received by a test receiver and correlated with the original sequence. The output of correlation may be referred to as the channel impulse response. The transfer function of the channel impulse response may be used to estimate channel environment. Synchronization issues and latency often cause problems in conventional channel sounding systems.

SUMMARY

Techniques are disclosed relating to channel sounding. In some embodiments, channel sounding techniques use a repeated Constant Amplitude Zero Autocorrelation (CAZAC) sequence and the receiver delays processing until a time interval corresponding in length to the CAZAC sequence has passed after transmission begins. In some embodiments, this results in the receiver receiving a circularly-shifted CAZAC sequence. In some embodiments, the receiver processes the received circularly-shifted CAZAC sequence, without performing timing synchronization on the received sequence, to determine both channel impulse response (CIR) and time of arrival (TOA). The disclosed techniques may reduce time needed for channel sounding and/or improve channel sounding accuracy, in some embodiments.

Figure 1A:
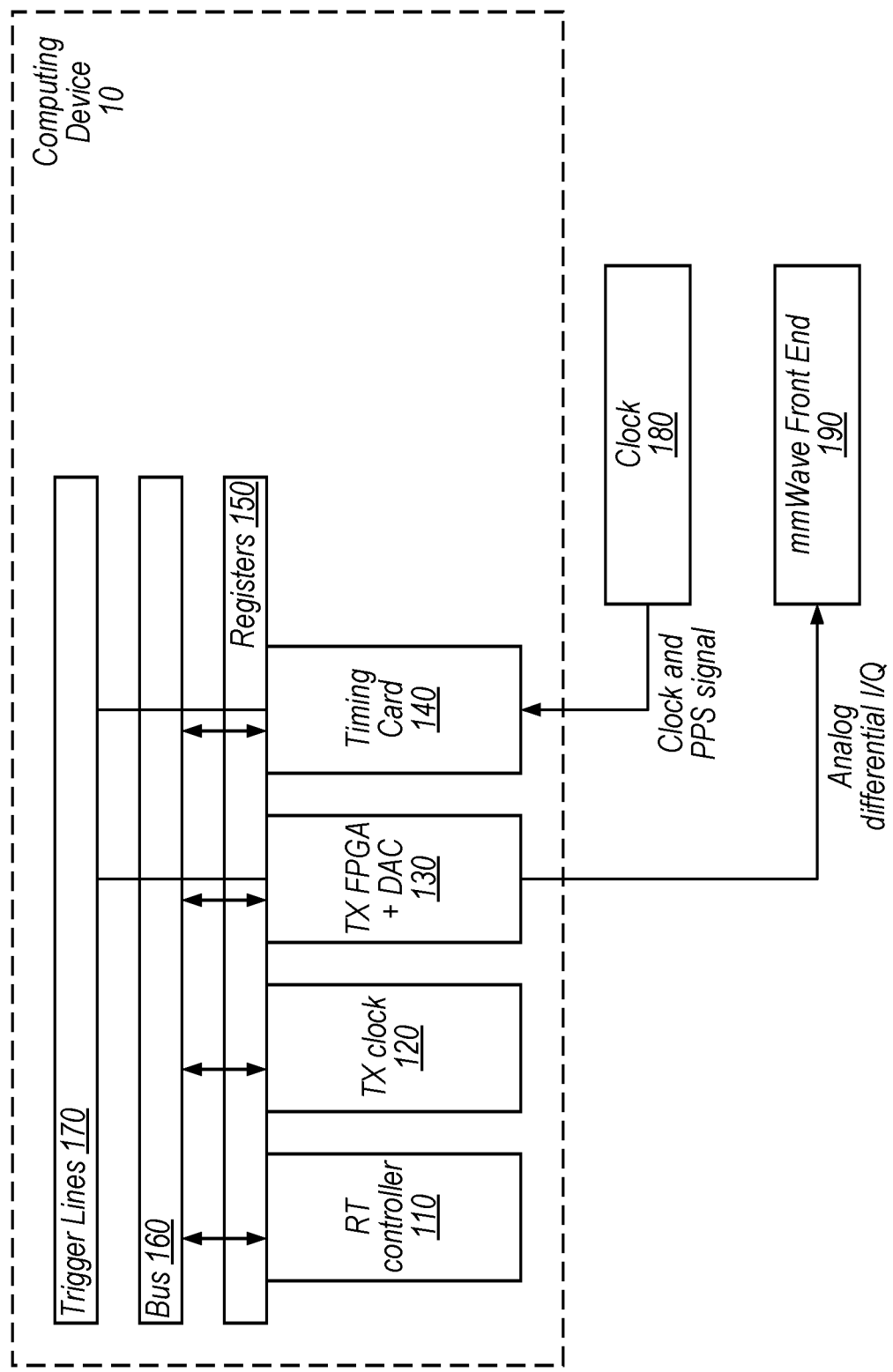
FIGS. 1A and 1B respectively illustrate an exemplary channel sounding receiver and transmitter, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

In various embodiments, a wireless transmitter is configured to transmit wireless signals in a wireless environment that are then received by a receiver and processed to determine channel information for the environment. In some embodiments, the transmitter transmits a repeated sequence and the receiver receives a circularly-shifted sequence. The repeated sequences from the transmitter may be periodic within the coherence time of the wireless channel.

FIG. 1A is a block diagram illustrating an exemplary channel sounding transmitter, according to some embodiments. In the illustrated embodiment, the transmitter receives a clock signal and a pulse-per-second (PPS) signal from clock circuitry 180. For example, the clock signal may be generated at 10 MHz using a Rubidium (Rb) clock. In other embodiments, any of various appropriate types of clocks, frequencies, or other characteristics may be used for these timing signals. In the illustrated embodiment, the transmitter is configured to transmit wireless signals using a field-programmable gate array (FPGA) and digital to analog converter 130 (which is coupled to an RT controller host 110) and a mmWave front end 190. The RT controller host 110 may be a general purpose processor, in some embodiments. Note that various front end circuitry may be used in various embodiments for different wireless frequencies, etc. mmWave front end 190 is shown for illustrative purposes but is not intended to limit the scope of the present disclosure.

In some embodiments, elements 110, 120, 135, and 140 are included in cards that plug into a backplane of computing device 10 (e.g., a PXIe backplane). In other embodiments, any of various types of connections may be used for bus 160 and/or trigger lines 170. The NI 6674t timing and synchronization model is one non-limiting exemplary embodiment of timing card 140. Timing card 140 may include or couple to clock 180 and transmit timing signals via trigger lines 170. The NI flexRIO card is one non-limiting exemplary embodiment of the FPGA in element 135 and the AT1212 is one non-limiting exemplary embodiment of the ADC in element 135. Finally, the NI 8135 RT controller is one non-limiting exemplary embodiment of element 110. The various elements of FIG. 1 may communicate via bus 160, trigger lines 170, and/or registers 150, in various embodiments.

Figure 1B:
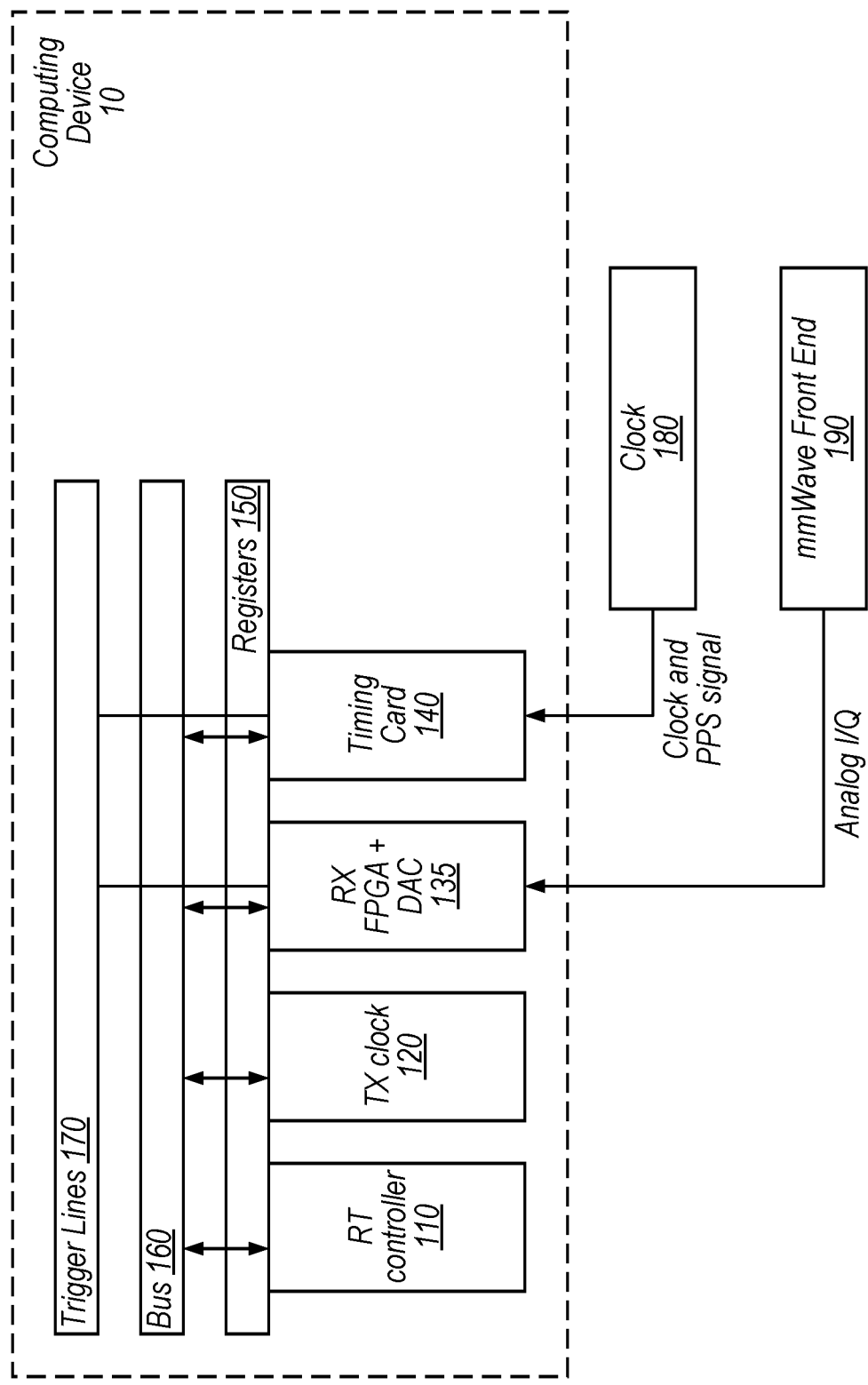

FIG. 1B is a block diagram illustrating an exemplary channel sounding receiver, according to some embodiments. In the illustrated embodiment, the receiver is also configured to receive clock and PPS signals and is also configured to receive signals from the transmitter using the mmWave front end 190. In various embodiments, the sounding system is configured to process these received signals to determine channel information. In some embodiments, the receiver of FIG. 1B includes components similar to those included in the transmitter of FIG. 1A. In various embodiments, however, the respective FPGAs and host controllers of the transmitter and receiver may be programmed differently.

In some embodiments, the receiver and transmitter each use a highly accurate clock such as a rubidium source. This source may be included in the transmitter/receiver or may be external as shown in FIGS. 1A and 1B. This may allow the receiver and transmitter to be initially synchronized (e.g., via a physical coupling) and then used separately for substantial time intervals, e.g., as much as an hour, before clock drift becomes problematic. In some embodiments, the local clock may be used to generate the PPS and 10 MHz signals shown in FIGS. 1A and 1B rather than receiving clock signals from an external clock. The clocks may or may not be disciplined using GPS, which may allow the system to operate in areas with weak GPS signals, in some embodiments.

Figure 2:
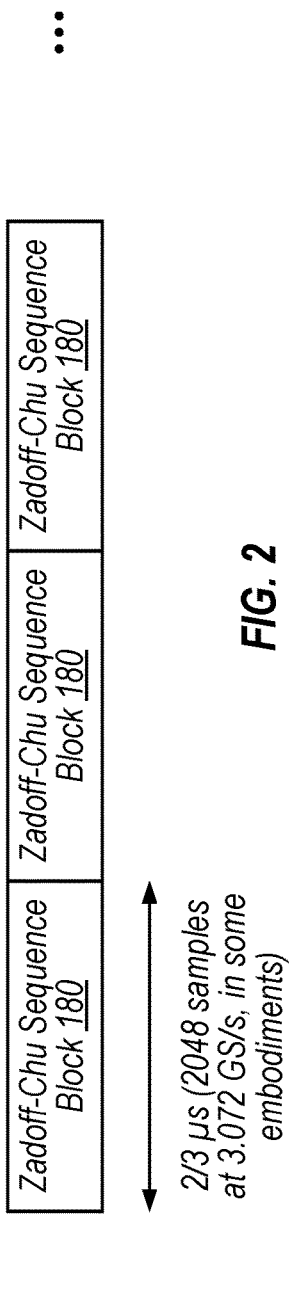
FIG. 2 illustrates a repeated sequence of an exemplary Zadoff-Chu (ZC) sequence, according to some embodiments.

FIG. 2 illustrates an example of signaling generated by the transmitter. In some embodiments, the transmitter is configured to repeatedly transmit a Zadoff-Chu (ZC) sequence. In the illustrated embodiment, the ZC sequence is 2048 samples long and has a period of ⅔rds of a microsecond. In other embodiments, various numbers of samples and period lengths may be implemented. In some embodiments, the received ZC sequence is periodic within the channel coherence time. ZC sequences received at the receiver may be correlated with a local copy to provide a channel impulse response (CIR) estimate. Further, in some embodiments the ZC sequences are selected for a particular sounding environment such that (1) the excess delay is less than the duration of the ZC sequence and (2) the time of arrival (TOA) is less than the duration of the ZC sequence. In these embodiments, the transmitted sequence may also be used to determine the TOA. Further, in some embodiments, no synchronization with the received signal is needed prior to frequency domain equalization and/or cross-correlation.

Zadoff-Chu (ZC) sequences are complex-valued mathematical sequences, which, when applied to radio signals, result in a signal with constant amplitude. Further, cyclically shifted versions of a ZC sequence imposed on a signal result in zero correlation with each other at the receiver and cyclically shifted versions of a ZC sequence are orthogonal. ZC sequences are a special type of Constant Amplitude Zero Autocorrelation (CAZAC) sequence. CAZAC sequences are complex-valued periodic sequences with cyclic autocorrelation equal to zero and constant amplitude. Although ZC sequences are discussed herein to facilitate illustration, any of various appropriate CAZAC sequences may be used in other embodiments instead of or in addition to ZC sequences.

Figure 3:
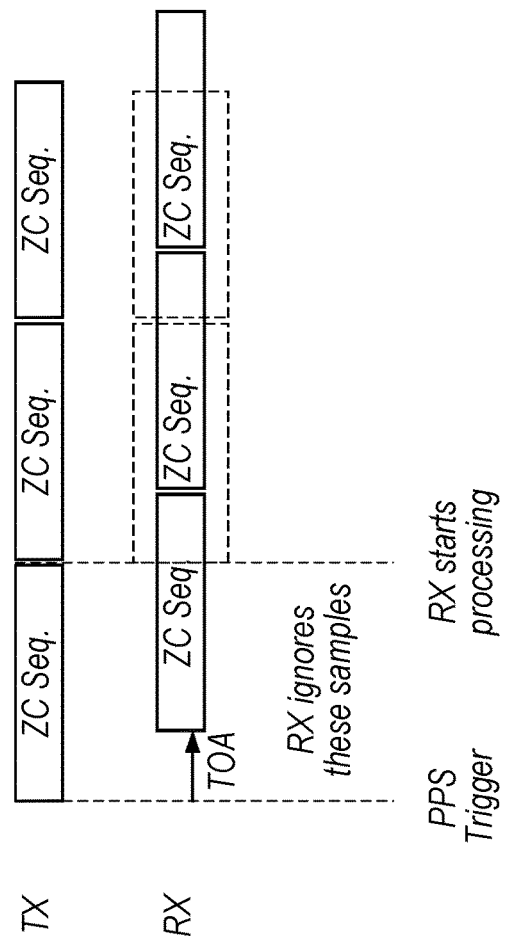
FIG. 3 illustrates exemplary transmission and processing of ZC sequences for channel sounding, according to some embodiments.

FIG. 3 is a timing diagram illustrating exemplary channel sounding signals, according to some embodiments. In the illustrated embodiment, the transmitter is configured to begin repeatedly transmitting a ZC sequence starting at a PPS trigger. In other embodiments, trigger timing signals at various granularities may be used, assuming that the transmitter and receiver are configured to detect a trigger at substantially the same time (e.g., any difference between transmitter and receiver clocks may be caused by clock drift, but should be minimized during the channel sounding process). In the illustrated embodiment, the receiver is configured to wait, after detecting the PPS trigger, until the transmitter has transmitted one full ZC sequence before beginning to process received samples. The PPS triggers may be synchronized because they come from the same clock or because the transmitter and receiver clocks have previously been synchronized. After waiting the duration of one ZC sequence, the receiver starts processing circular-shifted copies of the received ZC sequences. (As discussed above, ZC sequences are provided for exemplary purposes but any of various appropriate CAZAC sequences may be used in other embodiments.) The circular shifting may be caused by the delay between transmission and reception, which may vary between different environments.

In some embodiments, the system is configured to correlate the received circular shifted ZC copies with a local copy of the ZC sequence. This may result in a circularly shifted CIR that is usable to model the channel. The system may also estimate the TOA based on the shift, e.g., by locating the first tap in the channel. The disclosed techniques allow determination of both the CIR and TOA and also do not require timing synchronization based on the received signal to perform frequency domain equalization or cross-correlation, which may reduce latency in various embodiments. Frequency domain equalization and correlation traditionally need timing synchronization to determine the placement of the FFT window. This conventional timing synchronization is based on either autocorrelation of the received signal or its cross-correlation with the original sequence. In the disclosed techniques, however, cross correlation of the received ZC/CAZAC sequence with a local copy of the sequence may begin at any point (without prior timing synchronization), e.g., because of the periodic nature of the transmitted signal, which may simplify signal processing architecture, reduce latency, and/or also allow determination of the TOA.

Figure 4:
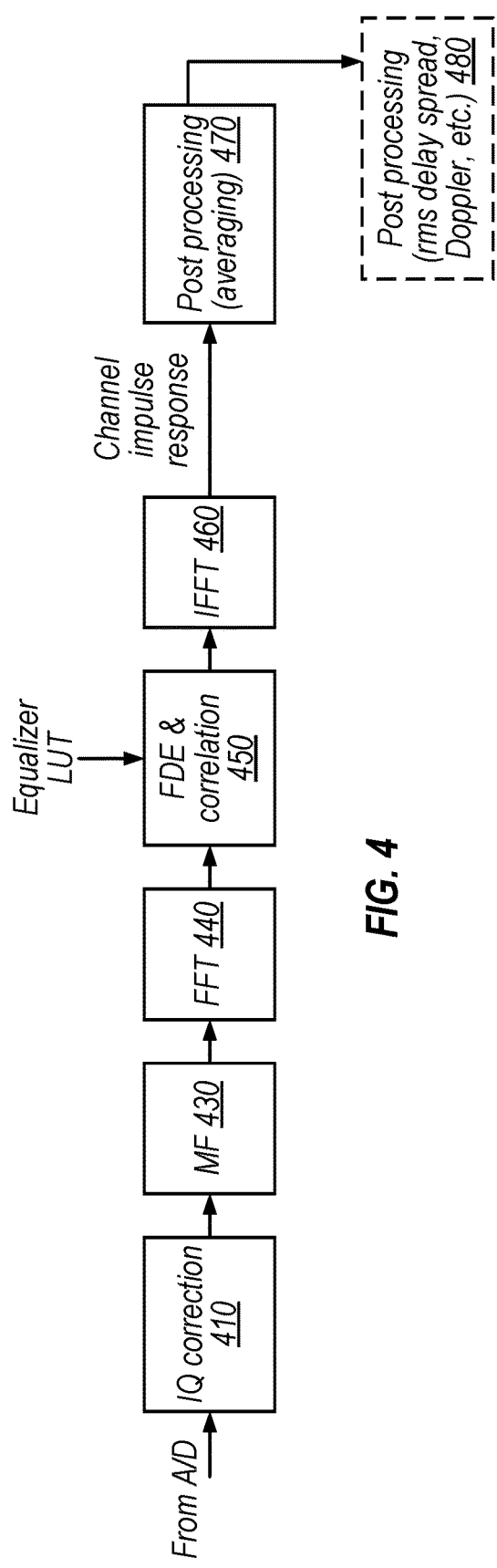
FIGS. 4-5 illustrate exemplary receiver architectures, according to some embodiments.

FIG. 4 is a block diagram illustrating a receiver architecture, according to some embodiments. In the illustrated embodiment, blocks with solid outlines are implemented using an FPGA while blocks with dashed outlines (the post processing block 480 in FIG. 4) are implemented using a host computing device, which may be a general-purpose processor (GPP). In the illustrated embodiment, digital data from an analog to digital converter (A/D) is processed in the following stages: in-phase and quadrature (IQ) correction 410, matched filtering (MF) processing 430, a fast Fourier transform (FFT) 440, frequency domain equalization and cross-correlation 450, and an inverse FFT 460 to determine the channel impulse response. The results are then averaged during post-processing 470 and used to determine RMS delay spread, Doppler parameters, etc. at 480, in the illustrated embodiment.

Figure 5:
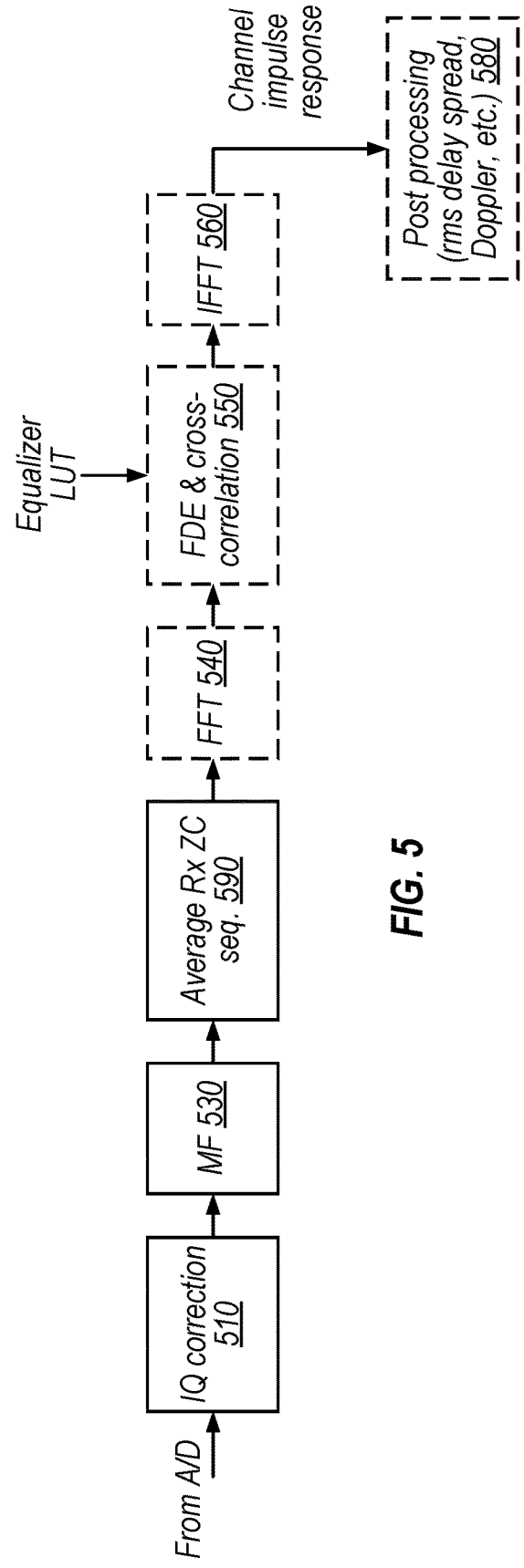

FIG. 5 is a block diagram illustrating another receiver architecture, according to some embodiments. In the embodiment of FIG. 5, averaging over multiple received circularly-shifted ZC sequences is performed early in the chain (at element 590), which may not affect the processing outcome because the subsequent operations are linear. In the illustrated embodiment, the IQ, MF, and averaging stages are performed by the FPGA while remaining stages are performed by the GPP. This averaging may improve sensitivity of the channel sounding results by reducing noise. Averaging may also reduce the amount of data sent to the GPP for an FFT, in some embodiments, relative to sending multiple sequences for processing rather than averaging the sequences.

Figure 6:
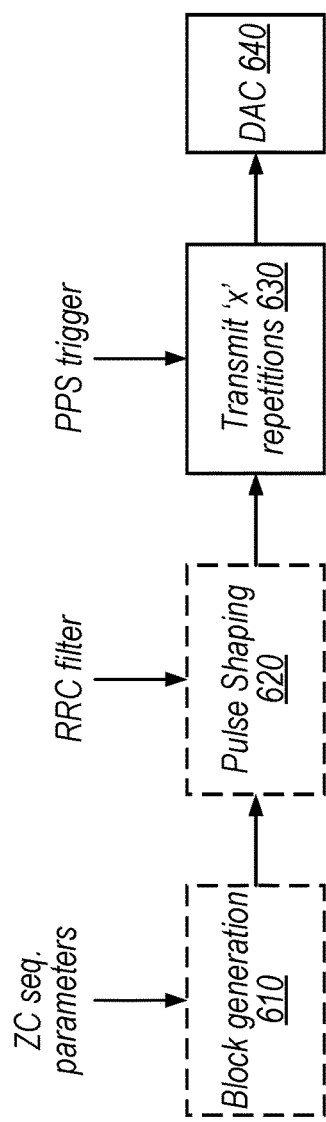
FIG. 6 illustrates an exemplary transmitter architecture, according to some embodiments.

FIG. 6 is a block diagram illustrating an exemplary transmitter architecture, according to some embodiments. In the illustrated embodiment, the transmitter includes a block generation unit 610, a pulse shaping unit 620, a unit configured to transmit a particular number of repetitions of a ZC sequence 630, and a digital to analog converter (DAC). In the illustrated embodiment, the block generation 610 and the pulse shaping 620 are performed on a GPP while the remaining operations are performed on an FPGA. The parameter 'x' may be shared between the transmitter and receiver so the receiver knows how many CAZAC periods to process before the transmitter will pause transmitting (e.g., for a guard period to switch antennas before a subsequent sounding transmission).

In various embodiments, the distribution of processing between programmable hardware elements and GPPs may be different; the disclosed distributions are discussed for purposes of illustration and are not intended to limit the scope of the present disclosure. Further, all of the functionality disclosed herein may be performed using a programmable hardware element, a dedicated integrated circuit, or a GPP, for example, in some embodiments.

Figure 7:
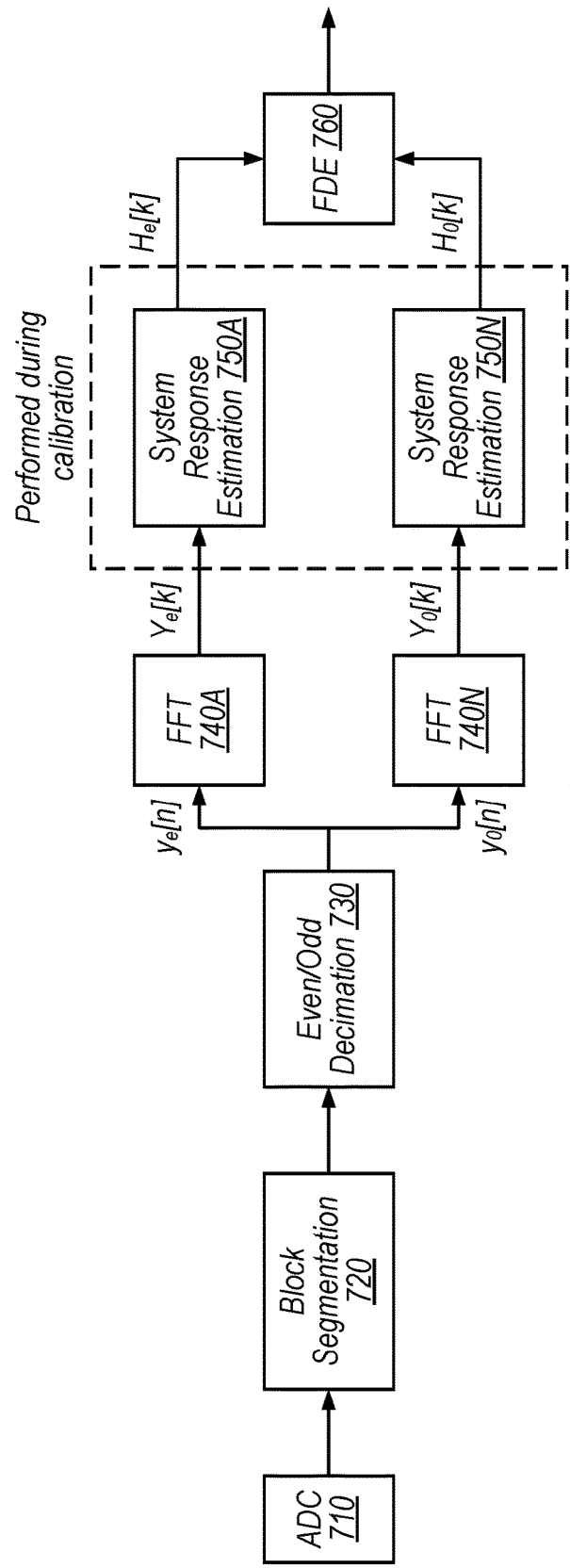
FIG. 7 illustrates an exemplary frequency domain sounding system response calibration/equalization procedure, according to some embodiments.

FIG. 7 is a block diagram illustrating exemplary frequency domain equalization (FDE), according to some embodiments. This technique may be used for sounding system response calibration and/or equalization, in some embodiments. In the illustrated embodiment, an analog to digital converter 710 provides samples to block segmentation unit 720, and decimation unit 730 performs even/odd decimation and sends results to different FFT blocks 740. During calibration, system response estimation blocks 750 separately processing the FFT results and then frequency domain estimation 760 is performed. FFT-based FDE may provide good performance with low complexity, in some embodiments, which may be particularly useful for FPGA implementations and for long CAZAC sequences.

Exemplary Method

Figure 8:
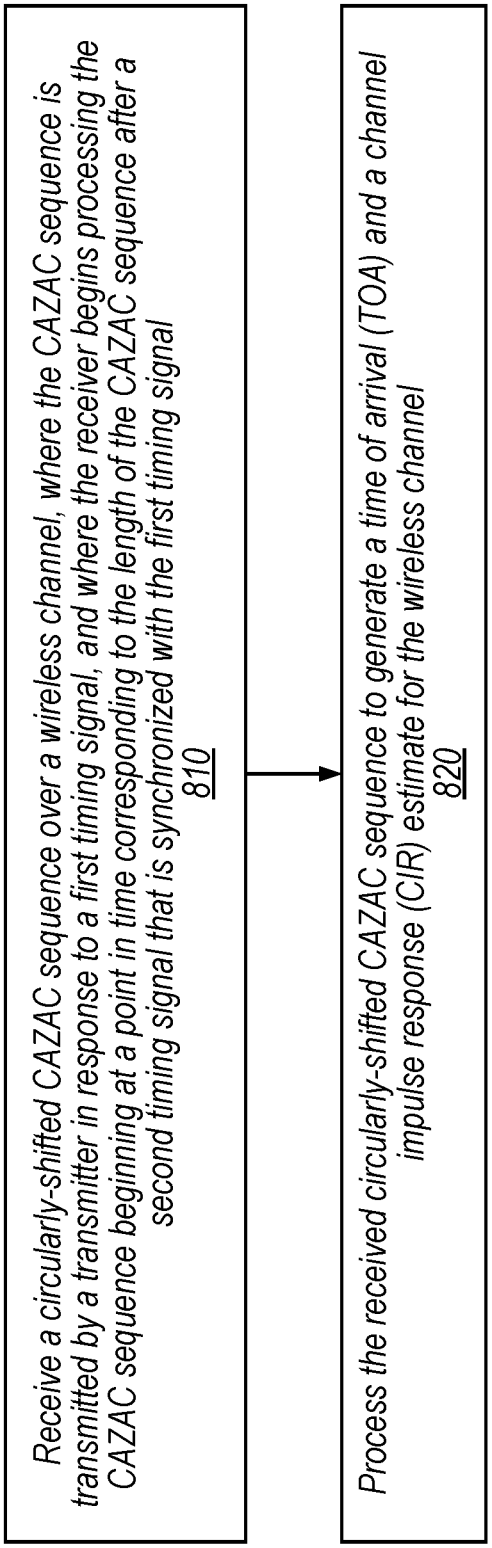
FIG. 8 is a flow diagram illustrating an exemplary method for generating a channel impulse response using a CAZAC sequence without performing timing synchronization on the received signal.

FIG. 8 is a flow diagram illustrating an exemplary method for determining a CIR that may be used without performing synchronization based on the received CAZAC sequence, according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, a wireless receiver receives a circularly-shifted CAZAC sequence over a wireless channel. In the illustrated embodiment, the CAZAC sequence is transmitted by a transmitter in response to a first timing signal (e.g., the PPS signal at the transmitter) and the receiver begins processing the CAZAC sequence beginning at a point in time corresponding to the length of the CAZAC sequence after a second timing signal (e.g., the PPS signal at the receiver) that is synchronized with the first timing signal. In some embodiments, the synchronization may be achieved by using the same clock for the transmitter and receiver, e.g., when the devices are physically coupled. In other embodiments, the synchronization may be achieved by synchronizing separate clocks on the transmitter and receiver (eventually, clock drift may cause the clocks to become unsynchronized). The first and second timing signal may or may not be the same signal, in various embodiments.

At 820, in the illustrated embodiment, the receiver processes the received circularly-shifted CAZAC sequence to generate a time of arrival (TOA) and a channel impulse response (CIR) estimate for the wireless channel. This may include averaging the circularly-shifted sequence over multiple receptions of the sequence, converting the averaged results to the frequency domain, and performing frequency domain equalization and cross-correlation, in some embodiments.

In various embodiments, the processing begins at an arbitrary point in the received circularly-shifted CAZAC sequence (e.g., starting based on the PPS signal rather than any particular point in the sequence), which may avoid a need for timing synchronization (determining the beginning of the sequence is not needed before further processing). Thus, the processing may be performed without auto-correlating the received CAZAC sequence with itself.

Further, the disclosed techniques may allow determination of TOA in addition to CIR. In various embodiments, the determined CIR may be usable to develop a model of the wireless channel.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9B:
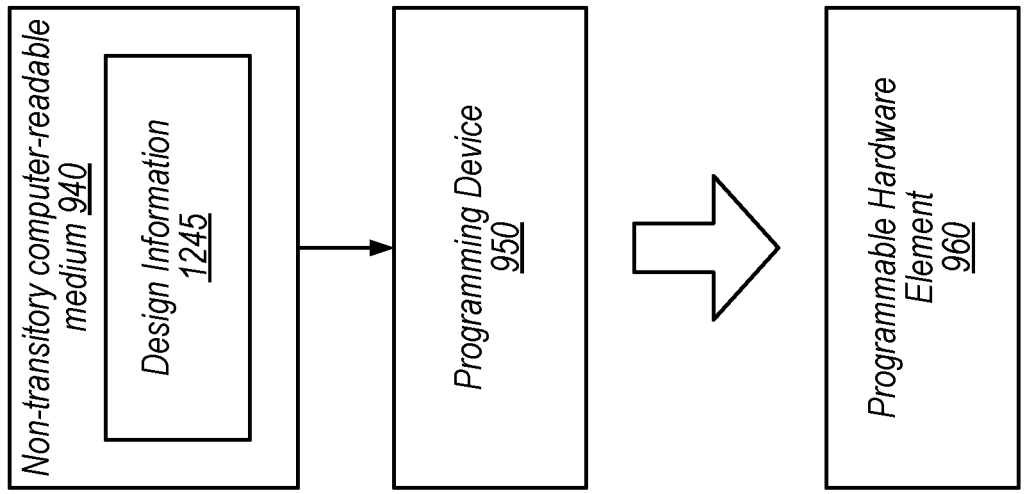
FIGS. 9A and 9B are block diagrams illustrating exemplary computer readable media.
Figure 9A:
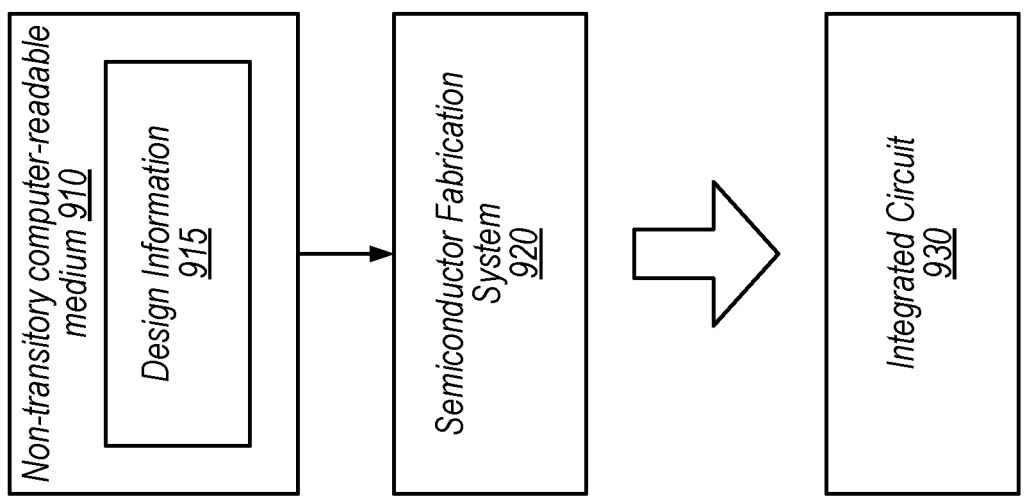

FIG. 9A is a block diagram illustrating an exemplary non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable medium 910, may comprise any of various appropriate types of memory devices or storage devices. Medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 910 may include other types of non-transitory memory as well or combinations thereof. Medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabrication at least a portion of integrated circuit 930. The format of design information 915 may be recognized by at least one semiconductor fabrication system 920. In some embodiments, design information 915 may also include one or more cell libraries which specify the synthesis and/or layout of integrated circuit 930. In some embodiments, the design information is specified in whole or in part in the form of a netlist that specifies cell library elements and their connectivity.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1A-1B, and/or 4-7. Further, integrated circuit 930 may be configured to perform various functions described herein in conjunction with other components. Further, the functionality described herein may be performed by multiple connected integrated circuits.

FIG. 9B is a block diagram illustrating an exemplary non-transitory computer-readable storage medium that stores design information for a programmable hardware element, according to some embodiments. In the illustrated embodiment programming device 950 is configured to process the design information 945 stored on non-transitory computer-readable medium 940 and program programmable hardware element 960 based on the design information 945.

Medium 940 and design information 945 may have features similar to medium 910 and design information 915, as discussed above. Hardware description languages used to design ASICs may be similar or different than those used to program programmable hardware elements. Programmable hardware element 960 may be a field-programmable gate array (FPGA), programmable logic array (PLA), complex programmable logic device (CPLD) etc. Programmable hardware element 960 may include logic blocks, hard blocks for common functions, configurable clocking structures, memories, fuses, etc. A given programmable hardware element 960 may be programmed differently at different times, e.g., by adjusting the functionality of the logic blocks, interconnections between circuit elements, etc.

In various embodiments, programmable hardware element 960 is configured, after being programmed, to operate according to the circuit design specified by design information 945, which may include performing any of the functionality described herein. For example, programmable hardware element 960 may implement any of various elements shown in FIGS. 1A-1B, and/or 4-7. Further, programmable hardware element 960 may be configured to perform various functions described herein in conjunction with other components. Further, the functionality described herein may be performed by multiple connected programmable hardware elements.

As used herein, the term "implement the circuit according to the design" includes both fabricating an integrated circuit according to the design and programming a programmable hardware element according to the design. Semiconductor fabrication system 920 and programming device 950 are examples of computing systems configured to implement circuits according to design information. Speaking generally, implementing a circuit according to a design may include other ways to implement hardware circuits in addition to the techniques discussed with references to FIGS. 9A and 9B. This term is intended to cover all such techniques for implementing hardware circuits according to design information stored in a computer-readable medium.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method, comprising:
a channel sounding transmitter transmitting a repeated Constant Amplitude Zero Autocorrelation (CAZAC) sequence over a wireless channel in response to a first timing signal at the transmitter;
a channel sounding receiver receiving a circularly-shifted CAZAC sequence over the wireless channel in response to the transmission; and
processing the received circularly-shifted CAZAC sequence to generate a time of arrival (TOA) and a channel impulse response (CIR) estimate for the wireless channel, wherein the processing begins based on samples received after a point in time and includes correlation of received samples with at least a portion of a local version of the transmitted CAZAC sequence, wherein the point in time corresponds to the length of the CAZAC sequence after a second timing signal that is synchronized to occur at a same target time as the first timing signal, and wherein the correlation operates only on samples received after the point in time.

2. The method of claim 1, wherein the processing is performed without performing synchronization to determine a beginning of the received CAZAC sequence.

3. The method of claim 1, wherein the processing includes averaging multiple circularly-shifted CAZAC sequences prior to performing a fast Fourier transform (FFT) and correlating the average of the circularly-shifted CAZAC sequences with a local version of the CAZAC sequence.

4. The method of claim 3, wherein the averaging is performed by a programmable hardware element and the correlating is performed by a processor.

5. The method of claim 1, wherein the channel sounding transmitter and channel sounding receiver are coupled to the same clock and the first timing signal and the second timing signal are the same signal.

6. The method of claim 1, further comprising:
synchronizing clocks on the transmitter and receiver;
wherein the first timing signal and the second timing signal occur at different times that are substantially the same as the target time due to clock drift.

7. The method of claim 1, wherein the first and second timing signals are pulse-per-second (PPS) signals.

8. A system, comprising:
one or more processors configured to:
receive a circularly-shifted Constant Amplitude Zero Autocorrelation (CAZAC) sequence from a wireless channel;
detect a timing signal that is synchronized to occur at a same target time as a timing signal at a transmitter of the CAZAC sequence that is used by the transmitter to initiate transmission of the sequence, wherein the CAZAC sequence is transmitted in a repeated manner by the transmitter; and
process the received circularly-shifted CAZAC sequence to generate a time of arrival (TOA) and a channel impulse response (CIR) of the wireless channel, wherein the processing begins based on samples received after a point in time and includes correlation of received samples with at least a portion of a local version of the transmitted CAZAC sequence, wherein the point in time corresponds to the length of the CAZAC sequence after the timing signal and wherein the correlation operates only on samples received after the point in time.

9. The system of claim 8, further comprising:
the transmitter, wherein the transmitter is configured to transmit the CAZAC sequence based on the synchronized timing signal.

10. The system of claim 9, wherein the transmitter and a receiver that includes the one or more processors are physically coupled during the transmission and reception.

11. The system of claim 8, wherein the one or more processors are configured to process the received circularly-shifted CAZAC sequence without performing synchronization to determine a beginning of the received CAZAC sequence.

12. The system of claim 8, wherein the one or more processors are further configured to:
generate an average of multiple circularly-shifted CAZAC sequences; and
correlate the average with a local version of the CAZAC sequence.

13. The system of claim 12, wherein the one or more processors are further configured to:
perform a frequency transform on the average prior to the correlation.

14. The system of claim 12, wherein the one or more processors include a programmable hardware element configured to generate the average and a processor configured to process the average.

15. The system of claim 8, wherein the timing signal is a pulse-per-second (PPS) signal and wherein the TOA and the CIR of the wireless channel are useable in creating a model of the wireless channel.

16. The system of claim 8, wherein the timing signal is synchronized between the transmitter and receiver prior to transmission of the CAZAC sequence and wherein the receiver and transmitter are not physically coupled during the transmission of the CAZAC sequence.

17. A non-transitory computer readable storage medium having stored thereon design information that specifies a design of at least a portion of a hardware circuit in a format recognized by a computing system configured to process the design information to implement the circuit according to the design, wherein the design information specifies that the implemented circuit includes:
one or more processors configured to:
receive a circularly-shifted Constant Amplitude Zero Autocorrelation (CAZAC) sequence from a wireless channel;
detect a timing signal that is synchronized to occur at a same target time as a timing signal at a transmitter of the CAZAC sequence that is used by the transmitter to initiate transmission of the sequence, wherein the CAZAC sequence is transmitted in a repeated manner by the transmitter; and
process the received circularly-shifted CAZAC sequence to generate a time of arrival (TOA) and a channel impulse response (CIR) of the wireless channel, wherein the processing begins based on samples received after a point in time and includes correlation of received samples with at least a portion of a local version of the transmitted CAZAC sequence, wherein the point in time corresponds to the length of the CAZAC sequence after the timing signal and wherein the correlation operates only on samples received after the point in time.

* * * * *